(12) United States Patent
Jovet et al.

(10) Patent No.: US 10,266,036 B2
(45) Date of Patent: Apr. 23, 2019

(54) METHOD FOR OPERATING A DEVICE FOR THE THERMAL CONDITIONING OF A MOTOR VEHICLE INTERIOR AND DEVICE FOR IMPLEMENTING THE METHOD

(71) Applicant: Valeo Systemes Thermiques, Le Mesnil Saint Denis (FR)

(72) Inventors: Bastien Jovet, Le Mesnil Saint-Denis (FR); Fabrice Ailloud, Le Mesnil Saint-Denis (FR); Frédéric Ladrech, Le Mesnil Saint-Denis (FR); Philippe Pierres, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 51 days.

(21) Appl. No.: 15/528,267

(22) PCT Filed: Nov. 13, 2015

(86) PCT No.: PCT/EP2015/076515
§ 371 (c)(1),
(2) Date: May 19, 2017

(87) PCT Pub. No.: WO2016/083154
PCT Pub. Date: Jun. 2, 2016

(65) Prior Publication Data
US 2017/0291471 A1 Oct. 12, 2017

(30) Foreign Application Priority Data
Nov. 25, 2014 (FR) ...................................... 14 61411

(51) Int. Cl.
*B60H 1/00* (2006.01)
*B60H 1/32* (2006.01)

(52) U.S. Cl.
CPC ....... *B60H 1/3211* (2013.01); *B60H 1/00835* (2013.01); *B60H 2001/3238* (2013.01); *B60H 2001/3282* (2013.01)

(58) Field of Classification Search
CPC .............. B60H 1/3211; B60H 1/00835; B60H 2001/3282; B60H 2001/3238; F25B 49/022; F24F 11/83; F24F 11/84
See application file for complete search history.

(56) References Cited

U.S. PATENT DOCUMENTS 5,765,635 A * 6/1998 Rhee .................. B60H 1/00742
165/203
6,127,947 A * 10/2000 Uchida .............. B60G 17/0195
340/439

(Continued)

FOREIGN PATENT DOCUMENTS

EP 1 616 733 A1 1/2006
EP 1616733 A1 * 1/2006 ........... B60H 1/0005

(Continued)

OTHER PUBLICATIONS

International Search Report issued in PCT/EP2015/076515 dated Feb. 9, 2016 (2 pages).

(Continued)

*Primary Examiner* — Edward F Landrum
*Assistant Examiner* — Chang H. Park
(74) *Attorney, Agent, or Firm* — Osha Liang LLP

(57) ABSTRACT

A method for operating a device for the thermal conditioning of a motor vehicle interior, including: a refrigerant circuit including a compressor and a heat exchanger able to form an evaporator, the heat exchanger being able to exchange heat with a flow of air intended to be conditioned, a bypass means able to divert from the heat exchanger at least part of said air flow and which can be controlled in terms of position between the closed position in which no flow is diverted (Continued)

from the heat exchanger and a multitude of open positions in which part of the flow is diverted from the heat exchanger according to the position of opening, a mixing zone for mixing the flow that has passed through the evaporator and the flow of air diverted by the bypass means.

17 Claims, 4 Drawing Sheets

(56) References Cited

U.S. PATENT DOCUMENTS

2008/0289347 A1* 11/2008 Kadle ................ B60H 1/00735
                                                                                                              62/226
2009/0246041 A1* 10/2009 Taguchi .............. F04B 27/1804
                                                                                                                        417/307

FOREIGN PATENT DOCUMENTS

| EP | 1 995 095 A1 | 11/2008 |
| FR | 2 847 973 A1 | 6/2004 |
| FR | 2 853 722 A1 | 10/2004 |
| FR | 2 878 613 A1 | 6/2006 |

OTHER PUBLICATIONS

Written Opinion of the International Searching Authority issued in PCT/EP2015/076515 dated Feb. 9, 2016 (5 pages).

\* cited by examiner

METHOD FOR OPERATING A DEVICE FOR THE THERMAL CONDITIONING OF A MOTOR VEHICLE INTERIOR AND DEVICE FOR IMPLEMENTING THE METHOD

The present invention relates to a method for operating a device for the thermal conditioning of a motor vehicle interior and a device for implementing said method.

The invention is applicable more particularly to thermal conditioning devices for motor vehicles, that is to say devices having the function more particularly of heating, cooling, filtering and/or dehumidifying the air injected into the interior.

A suchlike device conventionally includes a refrigerant circuit comprising an evaporator having the ability to exchange heat with a flow of air intended to discharge into the interior of the vehicle and a compressor.

In order to reduce the consumption of energy by a suchlike device, it is known to equip the device with a means for bypassing the flow of air from the evaporator having the ability to divert a part of the flow of air from the evaporator, depending on its position. Downstream of the evaporator, the diverted flow of air is mixed with the flow of air that has passed through the evaporator in order to obtain the desired setpoint temperature.

With suchlike bypass means, it is possible to cause the compressor to operate in a cyclical manner with an improved output, in particular in the case of a variable displacement compressor. In fact, in the latter case, the compressor is caused to function only in a cyclical manner with a high displacement and thus an improved output.

Although the consumption of energy by the device is clearly reduced with this type of operation, it is also possible to note cyclical variations in temperature of several degrees around the setpoint temperature. Suchlike variations are perceptible to a user and may reduce his feeling of comfort.

Figure 4:
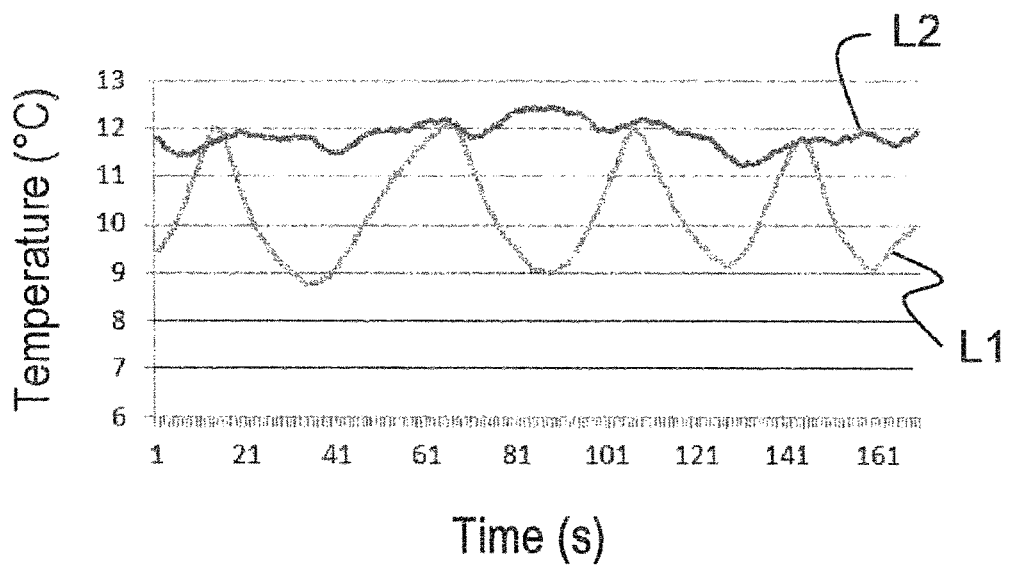

By way of example, FIG. 4 depicts according to a curve L1 the variation in temperature over time at the outlet from a thermal conditioning device according to the prior art for a setpoint temperature of 12° C. It can be noted that the temperature fluctuates between 9° C. and 12° C. Once the setpoint temperature of 12° C. has been reached, the compressor starts up until a temperature of about 9° C. is reached. At this moment, the compressor stops and the temperature rises once more to 12° C. and the cycle recommences.

The present invention proposes to optimize the operation of a device for the thermal conditioning of a motor vehicle interior.

For this purpose, the invention has as its object a method for operating a device for the thermal conditioning of a motor vehicle interior, including:
- a refrigerant circuit comprising a compressor and a heat exchanger having the ability to form an evaporator, the heat exchanger having the ability to exchange heat with a flow of air intended to be conditioned,
- at least one bypass means having the ability to divert from the heat exchanger at least part of said flow of air and having the ability to be controlled in respect of its position between a closed position, in which no flow is diverted from the heat exchanger, and a multitude of open positions, in which part of the flow is diverted from the heat exchanger on the basis of the open position,
- a mixing zone for mixing the flow of air that has passed through the evaporator and the flow of air diverted by the bypass means so as to obtain a flow of air at a setpoint temperature, in which the compressor operates in a cyclical manner having a period of operation in a first state, in which the compressor generates together with the heat exchanger a first quantity of frigories, alternating with a period of operation in a second state, in which the compressor generates together with the heat exchanger a second quantity of frigories lower than the first quantity, characterized in that the position of the bypass means is controlled in a cyclical manner consistent with the periods of operation of the compressor.

The consumption of the compressor thus reduces while maintaining the thermal comfort for the user.

The invention may exhibit one or a plurality of the following features, taken alone or in combination:
- the open position of the bypass means is controlled on the basis of at least one control law pre-established on the basis of the outlet temperature from the heat exchanger,
- the control law is a function which decreases monotonically,
- the control law is recorded in a memory of a control unit (UC),
- the bypass means are controlled in a cyclical manner between an open position and a closed position, and the duration of the period in the open position is longer than the operating period in the first state of the compressor,
- the period of opening of the bypass means is longer than 1 to 10 seconds, compared to the operating period in the first state of the compressor,
- the bypass means move from a closed position to an open position when the compressor moves from an operating period in the second state to an operating period in the first state,
- the temperature at the outlet from the heat exchanger is measured with the help of a temperature probe the open position and the closed position of the bypass means are controlled on the basis of the control law and the measured temperature,
- the temperature probe is disposed downstream of the heat exchanger in a manner that is protected in relation to the flow of air originating from the bypass means,
- the compressor is a clutchless variable displacement compressor, and the first operating state corresponds to an operation with a high displacement, and the second operating state corresponds to an operation with a lower displacement than in the first state, preferably a minimal displacement,
- the compressor is a clutchable compressor, and the first operating state corresponds to a clutched state of the compressor, and the second operating state corresponds to a declutched state of the compressor,
- the bypass means comprise at least one control valve D, of which the open position and the closed position is adjustable.

The invention likewise relates to a device for the thermal conditioning of a motor vehicle interior, including:
- a refrigerant circuit comprising a compressor and a heat exchanger having the ability to form an evaporator, the heat exchanger having the ability to exchange heat with a flow of air intended to be conditioned,
- at least one bypass means having the ability to divert from the heat exchanger at least part of said flow of air and having the ability to be controlled in respect of its position between a closed position, in which no flow is diverted from the heat exchanger, and a multitude of open positions, in which part of the flow is diverted from the heat exchanger in the open position, a mixing zone for mixing the flow of air that has passed through the evaporator and the flow of air diverted by the bypass means so as to obtain a flow of air at a setpoint temperature, a control unit configured in order to cause the compressor to operate in a cyclical manner having a period of operation in a first state, in which the compressor generates together with the heat exchanger a first quantity of frigories, alternating with a period of operation in a second state, in which the compressor generates together with the heat exchanger a second quantity of frigories lower than the first quantity, characterized in that the control unit is also connected to the bypass means in order to control the position of the bypass means in a cyclical manner consistent with the periods of operation of the compressor.

The device may include one or a plurality of the following characterizing features taken alone or in combination:

the open position of the bypass means is controlled on the basis of at least one control law pre-established on the basis of the outlet temperature from the heat exchanger, the control law is a function which decreases monotonically, the control law is recorded in a memory of the control unit, the control unit is configured in order to control the bypass means in a cyclical manner between an open position and a closed position, and the duration of the period in the open position is longer than the operating period in the first state of the compressor, the period of opening of the bypass means is longer than 1 to 10 seconds, more particularly 2 seconds, compared to the operating period in the first state of the compressor, the control unit is configured in order to control the bypass means to move from a closed position to an open position when the compressor moves from an operating period in the second state to an operating period in the first state, the device comprises in addition a temperature probe intended to measure the temperature at the outlet from the heat exchanger, and the control unit is connected to the temperature probe and is configured in order to control the open and the closed positions of the bypass means on the basis of the control law and the temperature measured by the temperature probe, the temperature probe is disposed downstream of the heat exchanger in a manner that is protected in relation to the flow of air originating from the bypass means, the compressor is a clutchless variable displacement compressor, and the first operating state corresponds to an operation with a high displacement, and the second operating state corresponds to an operation with a lower displacement than in the first state, preferably a minimal displacement, the compressor is a clutchable compressor, and the first operating state corresponds to a clutched state of the compressor, and the second operating state corresponds to a declutched state of the compressor, the bypass means comprise at least one control valve, of which the open position and the closed position is adjustable by means of a motor, the heat exchanger is a storage evaporator.

Figure 1:
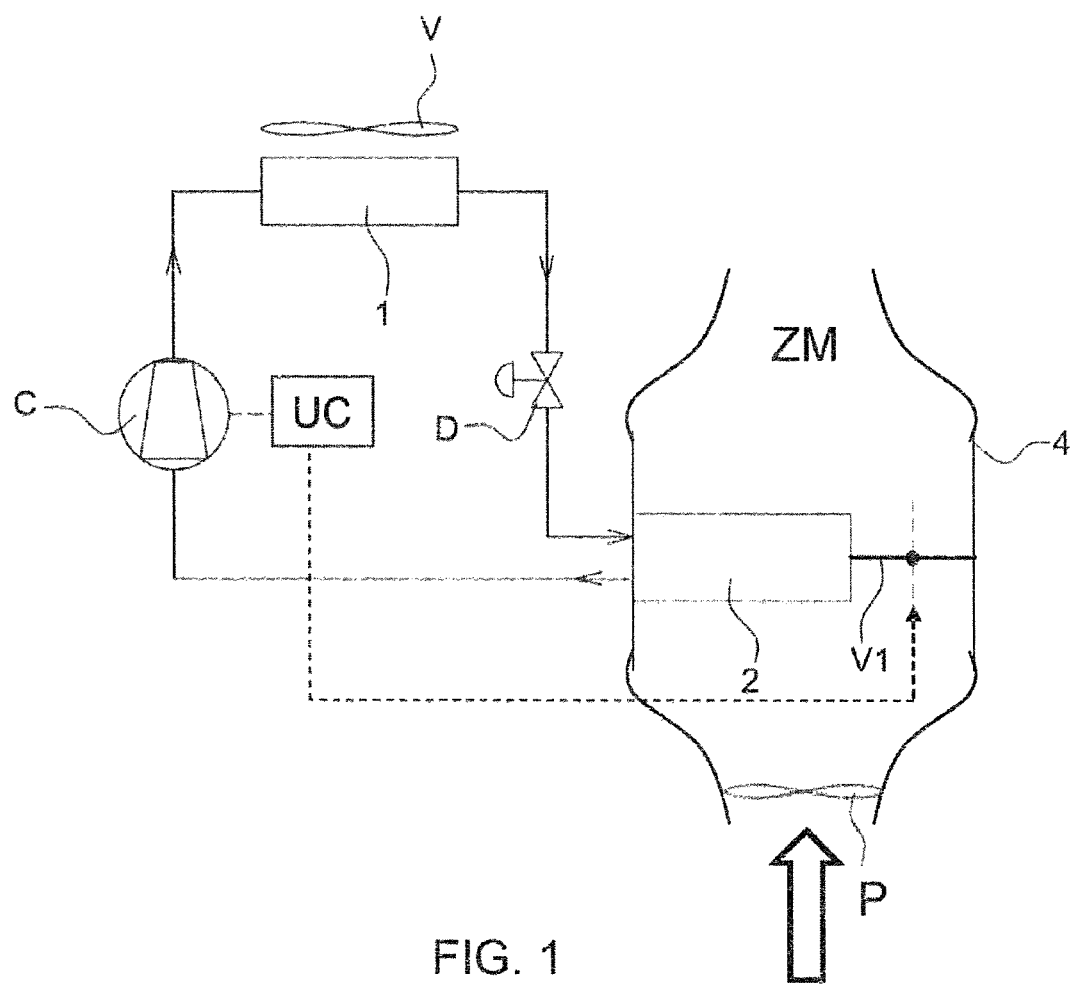
Figure 2:
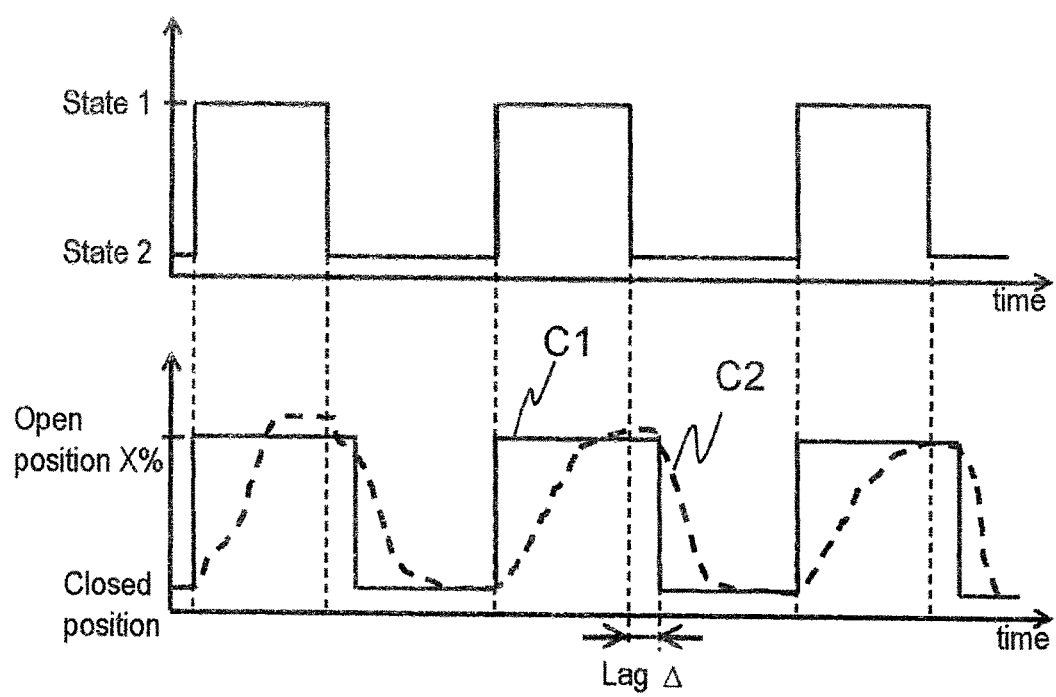
Figure 3:
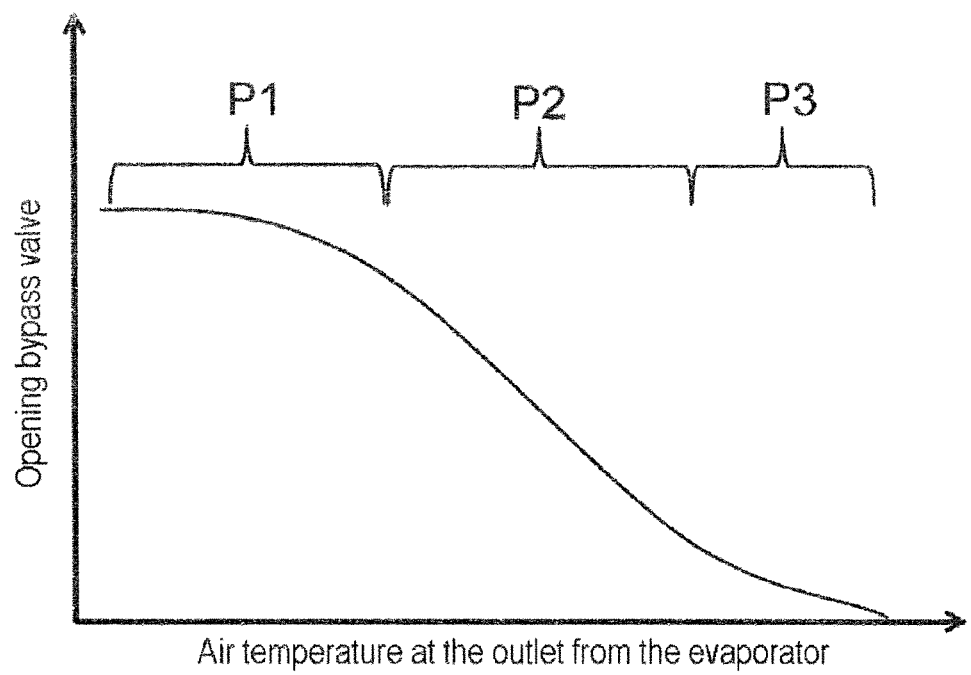
Figure 5:
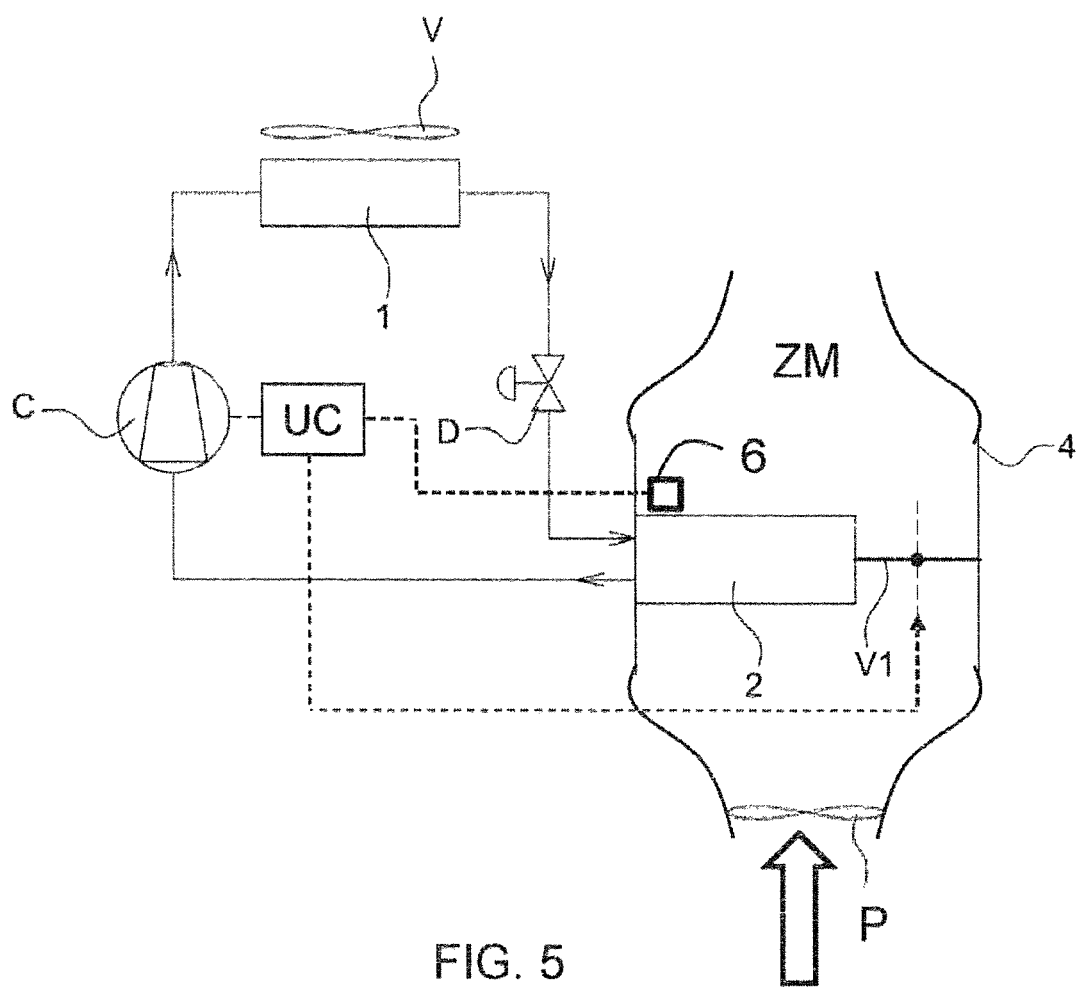

The invention will be more readily appreciated, and other details, characterizing features and advantages of the invention will emerge from a perusal of the following description, which is given by way of non-exhaustive example with reference to the accompanying drawings, in which:

FIG. 1 is a schematic view of a thermal conditioning device according to a first embodiment of the invention, FIG. 2 is a double diagram depicting, on the on hand, in the upper part, the operating state of the compressor and, on the other hand, in the lower part, the opening and closing commands of the bypass means, FIG. 3 is a schematic diagram depicting an example of a control law for opening the bypass means on the basis of the outlet temperature from the evaporator, FIG. 4 is a schematic diagram depicting the variation in the temperature obtained by the inventive device over time compared to a variation in temperature obtained by a device without a bypass duct according to the prior art, FIG. 5 is a schematic view of a thermal conditioning device according to a second embodiment of the invention.

Within the scope of the present invention, it should be noted that a frigorie (fg) is the opposite of a calorie (cal) and therefore verifies the equation 1 fg=−1 cal. Whereas the calorie expresses a quantity of heat corresponding to 4.2 Joules, a frigorie consequently expresses a quantity of cold.

In the present description, the expression "upstream" is used to denote that one element is positioned ahead of another element in relation to the direction of circulation of the refrigerant. On the other hand, the expression "downstream" is intended to denote that one element is positioned after another element in relation to the direction of circulation of the refrigerant.

FIG. 1 illustrates a device for the thermal conditioning of a motor vehicle interior according to a first embodiment, including a refrigerant circuit comprising a first heat exchanger 1 with the ability to form a condenser and a second heat exchanger 2 with the ability to form an evaporator.

According to a variant embodiment, the heat exchanger 2 may be a simple evaporator.

According to another variant embodiment, the heat exchanger 2 may be a storage evaporator.

An evaporator having the ability to store refrigerants, also referred to as a storage evaporator, is known, for example, from documents FR 2 847 973 and FR 2 878 613. A suchlike evaporator includes, for example, a reservoir containing a phase-change material (also known under the English acronym PCM for "Phase-Change Material"), having the ability to solidify or to liquefy. Through this change in phase, a suchlike material permits the storage of calorific energy or frigories in the form of the latent heat of solidification or liquefaction. Said stored frigories may be transferred to a flow of air in such a way as to cool it, in particular when the compressor is stopped. The phase-change materials that are used most commonly are paraffins, of which the liquefaction point lies between 5° C. and 12° C.

The refrigerant circuit includes in addition a compressor C, intended to be driven by an engine of the vehicle, and an expansion device.

The compressor is a clutchable compressor and/or a variable displacement compressor, for example.

The compressor C, according to a first variant embodiment, may thus be a fixed displacement compressor containing a clutch. It is thus possible to distinguish a first operating state, the clutched state, according to which the compressor operates, and a second operating state, the declutched state, according to which the compressor is in the stopped state.

According to a second variant embodiment, the compressor C is a variable displacement compressor without clutching. In this case, a distinction is made between a first operating state, which corresponds to operation with a high displacement and thus a high output, and a second operating state corresponding to operation with a smaller displacement than in the first state, and thus a lower output. The second operating state corresponds, for example, to an operating state with a minimal displacement.

According to a third variant embodiment, which is a sort of combination of the two preceding variant embodiments, the compressor C is a variable displacement compressor with a clutch. In this case, a distinction is made between a first operating state, which corresponds to operation with a high displacement and thus a high output, and a second operating state corresponds to a declutched state, according to which the compressor is in the stopped state.

Preferably, a fan V allows a flow of air to be caused to circulate through the first heat exchanger 1.

At least one first bypass means, for example a valve V1, may be mounted in proximity to the second heat exchanger 2.

The valve V1 is movable between two extreme positions, namely a first extreme position (represented by a solid line), in which no flow of air is able to bypass the second heat exchanger, and a second extreme position (represented by dashed lines), in which at least a part of a flow of air is able to bypass the second heat exchanger 2.

Of course, the position of the valve V1 may be adjusted by an electric motor, typically being a stepping motor, in order, as required, to reach intermediate open positions situated between said extreme positions.

The conditioning device in addition comprises a control unit UC, which is connected (represented by dashed lines) more particularly, on the one hand, to the compressor C in order to control its operating state, and, on the other hand, to the positioning motor of the valve V1 in order to control the open position and the closed position of the valve V1.

Downstream, the outlet from the evaporator 2 and from the flap are connected to a duct 4 having a mixing zone ZM, which typically belongs to a heating, ventilation and/or air-conditioning system, also known as H.V.A.C. (Heating, Ventilation and Air-Conditioning).

The heating, ventilation and/or air-conditioning installation more particularly comprises a pulser P, for example positioned upstream of the evaporator 2.

A flow of air at a setpoint temperature that is to be supplied to the interior in order to ensure the thermal comfort of the users is obtained by mixing, on the one hand, the air at the outlet from the evaporator 2 and, on the other hand, the flow downstream of the valve V1.

Of course, other components of a heating, ventilation and/or air-conditioning system may be provided downstream of or parallel to the above-mentioned device without going beyond the scope of the present invention, more particularly other heat exchangers having the ability to form an evaporator or a radiator.

The method for operating the above-mentioned device is now described in detail in relation to FIGS. 1 to 4.

The control unit UC is configured in order to cause the compressor C to function in a cyclical manner having a period of operation in a first state, in which the compressor generates together with the heat exchanger a first quantity of frigories, alternating with a period of operation in a second state, in which the compressor generates together with the heat exchanger a second quantity of frigories lower than the first quantity.

This is illustrated in the upper part of FIG. 2 showing the commands from the control unit UC in order to cause the compressor C to operate in a cyclical manner in the first and the second state.

In the case of a clutchable compressor C, having a variable displacement or otherwise, the second operating state corresponds to a declutched state, the compressor being stopped in this case. The first operating state corresponds to a clutched state, preferably with a high displacement, or maximum displacement, in the case of a variable displacement compressor.

In the case of a clutchless variable displacement compressor C, the second operating state corresponds to a state of smaller displacement, preferably a minimal displacement. The first operating state corresponds to a state having a high displacement, preferably a maximum displacement.

A first example of the controls according to the curve C1 from the control unit UC, in order to control the position of the bypass means, being the valve V1, in a cyclical manner consistent with the operating periods of the compressor C, are illustrated as a solid line in the lower part of FIG. 2.

More specifically, it can be appreciated that the control unit UC controls the bypass means in a cyclical manner between an open position and a closed position. In this case, the control curve C1 is a succession of rectangular signals.

The valve V1 moves from a closed position to an open position when the compressor C moves from an operating period in the second state to an operating period in the first state.

The degree of opening of the valve V1 is expressed as a percentage value in the present example, where 100% corresponds to a total opening (position of the valve V1 shown as a dashed line in FIG. 1), and 0% corresponds to the closed position of the valve V1 (position of the valve V1 shown as a solid line in FIG. 1).

The degree of opening or the position of opening of the valve V1 is controlled on the basis of at least one control law pre-established on the basis of the outlet temperature from the heat, exchanger 2.

An example of a suchlike control law is depicted in FIG. 3, which shows the open position of the valve V1 based on the temperature of the air at the outlet from the evaporator 2.

As can be appreciated in FIG. 3, the control law is a function which decreases monotonically.

When the temperature of the air at the outlet from the evaporator 2 is low, the valve V1 is then wide open. The higher the temperature of the air at the outlet from the evaporator 2, the closer the valve V1 is to the closed position.

According to one particular embodiment, a first part P1 having a gentle slope is followed by a second part P2 having a steep slope before terminating in a third part P3 as a gentle slope asymptotically approaching the closed position. It could be said that this control law exhibits a form which approaches the form of half of a normal distribution.

This control law is exemplified by the fact that, with the increase in the displacement of the compressor in order for its output to be better, the temperature of the air at the outlet from the evaporator will be lower. In order to compensate for this reduction in the temperature of the air at the outlet from the evaporator 2, it is necessary to open the bypass valve V1 in order to maintain the temperature at a constant level after mixing the air in the mixing zone ZM downstream of the valve V1 and the evaporator 2.

The greater the displacement of the compressor, the colder the air at the outlet from the compressor, and the more the bypass valve V1 must be opened in order for the temperature of the air mixture to remain constant at the level of the setpoint.

According to a first case (case of the curve C1), the bypass valve is controlled in a closed position and a stable open position on the basis of the temperature of the air at the outlet from the evaporator.

According to a second case, as a variant and represented in FIG. 2 by a curve C2 as dashed lines, the bypass valve is controlled in real time on the basis of the temperature of the air at the outlet from the evaporator.

In these two cases, the opening of the valve is determined by a law as illustrated in FIG. 3.

The most significant gains are obtained with flows of air bypassing the evaporator in the order of 20 to 30% of the total flow of air. One should therefore pay great attention to dimensioning the bypass duct of the evaporator 2 so that it is able to allow the passage of 20 to 30% of the flow of air arriving in the HVAC.

This control law is determined for a multitude of flows of air passing through the HVAC and recorded in a memory of a control unit UC.

In addition, it can be noted in FIG. 2 that the duration of the period in the open position of the valve V1 is longer than the period of operation in the first state of the compressor C. In other words, a certain delay or a lag Δ is introduced between the switching of the compressor C from the first operating state towards the second operating state, on the one hand, and the closing of the valve V1.

This lag reflects the fact that, just after stopping the compressor C, the temperature at the outlet from the evaporator 2 is still low, and that a certain time, comprised between 1 s and 10 s, for example typically 2 seconds, is required in order for the air temperature to increase at the outlet from the evaporator 2. Under these conditions, it is possible to close the valve or to initiate the closure of the valve V1 after the compressor C has stopped, for example with a certain lag.

The time lag Δ will depend on the thermal load on the evaporator 2. It is therefore necessary to map out the optimal delay in relation to the cold power on the evaporator 2. These data are likewise stored, for example, in a memory of the central unit UC.

The result of the method according to the invention is depicted in FIG. 4 with the curve L2. It should be noted that the temperature of the flow of air delivered to the HVAC remains very close to the setpoint temperature of 12° C., and that the variations in temperature are lower than 1° C., which is imperceptible to a user.

Consequently, the thermal comfort for the user will be maintained while benefiting from a resulting gain in energy of up to 20% by causing the compressor C to operate in a cyclical manner, more particularly a variable displacement compressor.

FIG. 5 depicts a diagram of a thermal conditioning device according to a second embodiment of the invention.

This embodiment differs from that in FIG. 1 in that a temperature probe 6 is positioned at the outlet from the heat exchanger 2.

More specifically, the temperature probe 6 is disposed downstream of the heat exchanger in a manner that is protected in relation to the flow of air originating from the valve V1.

The temperature probe 6 is connected to the control unit which makes use of this temperature in order to control the open and closed positions of the bypass means on the basis of the control law and the measured temperature.

In order to ensure that the measurement by the temperature probe is not erroneous, for example on account of the warmer air originating from the bypass duct, the probe 6 is disposed behind a protective cover, for example.

The operation of this variant embodiment is very similar to that of the device in FIG. 1, except for the fact that the closing of the valve V1 is controlled by taking into account the measurement by the probe 6 of the rise in temperature at the outlet from the evaporator 2 and the control law.

This variant embodiment permits the even more precise management of the temperature of the flow of air to be supplied to the HVAC.

It will be appreciated, therefore, that the similarly cyclical management of the bypass means, in particular the valve V1, will make it possible to obtain a flow of air at a temperature with fewer fluctuations around the setpoint temperature.

The invention claimed is:

1. A method for operating a device for the thermal conditioning of a motor vehicle interior, comprising:
exchanging heat with a flow of air configured to be conditioned by a refrigerant circuit comprising a compressor and a heat exchanger forming an evaporator;
diverting, from the heat exchanger and by at least one bypass means, at least part of said flow of air, the at least one bypass means having the ability to be controlled between a closed position, in which no flow is diverted from the heat exchanger, and a plurality of open positions, in which part of the flow is diverted from the heat exchanger on the basis of one of the plurality of open positions;
mixing the flow of air that has passed through the evaporator and the flow of air diverted by the at least one bypass means to obtain the flow of air at a setpoint temperature; and
operating the compressor in a cyclical manner having a period of operation in a first state, in which the compressor generates together with the heat exchanger a first quantity of frigories stored in the first state, alternating with a period of operation in a second state, in which the compressor generates together with the heat exchanger a second quantity of frigories stored in the second state, wherein the second quantity is lower than the first quantity,
wherein the position of the at least one bypass means is controlled in a cyclical manner consistent with the first and second state periods of operation of the compressor,
wherein the at least one bypass means is controlled in a cyclical manner between an open position among the plurality of open positions and the closed position, and
wherein the duration of a period of the open position is longer than the period of operation in the first state of the compressor.

2. The method as claimed in claim 1, wherein the open position of the at least one bypass means is controlled on the basis of at least one control law pre-established on the basis of the outlet temperature of an outlet from the heat exchanger.

3. The method as claimed in claim 2, wherein the at least one control law is a function which decreases monotonically in response to opening of the at least one bypass valve.

4. The method as claimed in claim 3, wherein the at least one control law is recorded in a memory of a control unit.

5. The method as claimed in claim 1, wherein the at least one bypass means move from the closed position to an open position among the plurality of open positions when the compressor moves from the period of operation in the second state to the period of operation in the first state.

6. The method as claimed in claim 2, wherein the temperature at the outlet from the heat exchanger is measured using a temperature probe, and an open position among the plurality of open positions and the closed position of the at least one bypass means are controlled on the basis of the at least one control law and the measured temperature.

7. The method as claimed in claim 1, wherein the compressor is a clutchless variable displacement compressor, and wherein the first operating state corresponds to an operation with a high displacement, and the second operating state corresponds to an operation with a lower displacement than in the first state.

8. The method as claimed in claim 1, wherein the compressor is a clutchable compressor, and the first operating state corresponds to a clutched state of the compressor, and the second operating state corresponds to a declutched state of the compressor.

9. A device for the thermal conditioning of a motor vehicle interior, comprising:
   a refrigerant circuit comprising a compressor and a heat exchanger configured to form an evaporator, the heat exchanger being configured to exchange heat with a flow of air intended to be conditioned;
   at least one bypass means configured to divert from the heat exchanger at least part of said flow of air and configured to be controlled between a closed position, in which no flow is diverted from the heat exchanger, and a plurality of open positions, in which part of the flow is diverted from the heat exchanger on the basis of one of the plurality of open positions;
   a mixing zone for mixing the flow of air that has passed through the evaporator and the flow of air diverted by the at least one bypass means so as to obtain the flow of air at a setpoint temperature; and
   a control unit configured to cause the compressor to operate in a cyclical manner having a period of operation in a first state, in which the compressor generates together with the heat exchanger a first quantity of frigories stored in the first state, alternating with a period of operation in a second state, in which the compressor generates together with the heat exchanger a second quantity of frigories stored in the second state, wherein the second quantity is lower than the first quantity,
   wherein the control unit is also connected to the at least one bypass means to control the position of the at least one bypass means in a cyclical manner consistent with the first state and second state periods of operation of the compressor,
   wherein the control unit is configured to control the at least one bypass means in a cyclical manner between an open position among the plurality of open positions and the closed position, and
   wherein the duration of the period in the open position is longer than the period of operation in the first state of the compressor.

10. The device as claimed in claim 9, wherein the open position of the at least one bypass means is controlled on the basis of at least one control law pre-established on the basis of the outlet temperature of an outlet from the heat exchanger.

11. The device as claimed in claim 9, wherein the control unit is configured to control the at least one bypass means to move from the closed position to an open position among the plurality of open positions when the compressor moves from the period of operation in the second state to the period of operation in the first state.

12. The device as claimed in claim 9, further comprising a temperature probe for measuring a temperature at an outlet from the heat exchanger, wherein the control unit is connected to the temperature probe and is configured to control the plurality of open positions and the closed position of the at least one bypass means on the basis of a control law and the temperature measured by the temperature probe.

13. The device as claimed in claim 12, wherein the temperature probe is disposed downstream of the heat exchanger in a manner that is protected in relation to the flow of air originating from the at least one bypass means.

14. The device as claimed in claim 9, wherein the compressor is a clutchless variable displacement compressor, and wherein the first operating state corresponds to an operation with a high displacement and the second operating state corresponds to an operation with a lower displacement than in the first state.

15. The device as claimed in claim 9, wherein the compressor is a clutchable compressor, and wherein the first operating state corresponds to a clutched state of the compressor and the second operating state corresponds to a declutched state of the compressor.

16. The device as claimed in claim 9, wherein the at least one bypass means comprise at least one control valve, of which the open position and the closed position is adjustable by a motor.

17. A device for the thermal conditioning of a motor vehicle interior, comprising:
   a refrigerant circuit comprising a compressor and a heat exchanger configured to form an evaporator, the heat exchanger being configured to exchange heat with a flow of air intended to be conditioned;
   at least one bypass means configured to divert from the heat exchanger at least part of said flow of air and configured to be controlled between a closed position, in which no flow is diverted from the heat exchanger, and a plurality of open positions, in which part of the flow is diverted from the heat exchanger on the basis of one of the plurality of open positions;
   a mixing zone for mixing the flow of air that has passed through the evaporator and the flow of air diverted by the at least one bypass means so as to obtain the flow of air at a setpoint temperature; and
   a control unit configured to cause the compressor to operate in a cyclical manner having a period of operation in a first state, in which the compressor generates together with the heat exchanger a first quantity of frigories stored in the first state, alternating with a period of operation in a second state, in which the compressor generates together with the heat exchanger a second quantity of frigories stored in the second state, wherein the second quantity is lower than the first quantity,
   wherein the control unit is also connected to the at least one bypass means to control the position of the at least one bypass means in a cyclical manner consistent with the first state and second state periods of operation of the compressor, and
   wherein the control unit is configured to control the at least one bypass means to move from the closed position to an open position among the plurality of open positions when the compressor moves from the period of operation in the second state to the period of operation in the first state.

\* \* \* \* \*